(12) United States Patent
Nishikiori et al.

(10) Patent No.: US 7,782,746 B2
(45) Date of Patent: Aug. 24, 2010

(54) OPTICAL INFORMATION RECORDING MEDIUM AND METHOD FOR MANUFACTURING SAME

(75) Inventors: Keiji Nishikiori, Kyoto (JP); Eiji Ohno, Osaka (JP); Shinya Abe, Okayama (JP)

(73) Assignee: Panasonic Corporation, Osaka (JP)

( * ) Notice: Subject to any disclaimer, the term of this patent is extended or adjusted under 35 U.S.C. 154(b) by 107 days.

(21) Appl. No.: 11/956,127

(22) Filed: Dec. 13, 2007

(65) Prior Publication Data

US 2008/0144483 A1 Jun. 19, 2008

(30) Foreign Application Priority Data

Dec. 15, 2006 (JP) .............................. 2006-338056

(51) Int. Cl.
*G11B 7/24* (2006.01)

(52) U.S. Cl. ................................... 369/275.5

(58) Field of Classification Search ........................ None
See application file for complete search history.

(56) References Cited

U.S. PATENT DOCUMENTS

| 6,667,952 | B2* | 12/2003 | Komaki et al. | ........... 369/275.5 |
| 2005/0179887 | A1* | 8/2005 | Suzawa et al. | ............. 355/100 |
| 2005/0180294 | A1* | 8/2005 | Kimura et al. | ......... 369/112.05 |
| 2005/0201264 | A1* | 9/2005 | Ushida et al. | ............ 369/275.5 |
| 2006/0022809 | A1 | 2/2006 | Lessard et al. | |
| 2006/0104188 | A1* | 5/2006 | Yamashita et al. | ....... 369/275.1 |
| 2006/0204707 | A1* | 9/2006 | Takazawa | ................... 428/64.4 |
| 2006/0222809 | A1* | 10/2006 | Yamada et al. | ............. 428/64.4 |
| 2006/0280085 | A1* | 12/2006 | Yamada et al. | ........... 369/53.14 |

FOREIGN PATENT DOCUMENTS

| JP | 3-248341 | 11/1991 |
| JP | 2004-253075 | 9/2004 |
| JP | 2006-277828 | 10/2006 |

* cited by examiner

*Primary Examiner*—Daniell L Negrón
*Assistant Examiner*—Henok G Heyi
(74) *Attorney, Agent, or Firm*—Wenderoth, Lind & Ponack, L.L.P.

(57) ABSTRACT

An optical information recording medium that has a simple structure and with which warpage is kept to a minimum even under environmental changes over a wide range, and a method for manufacturing this medium are provided. The optical information recording medium is an optical information recording medium used for the reproduction of recorded information and for recording and reproduction, including a substrate having an information recording layer, and a light transmitting layer that covers the information recording layer and is composed of a radiation curable resin, wherein a warpage adjusting layer for adjusting warpage of the light transmitting layer caused by temperature changes is disposed on the opposite side of the substrate from the side on which the information recording layer is formed. There is included at least a temperature region that satisfies the relationship that the coefficient of linear expansion CL of the light transmitting layer<the coefficient of linear expansion SL of the warpage adjusting layer, at temperatures under room temperature.

21 Claims, 13 Drawing Sheets

OPTICAL INFORMATION RECORDING MEDIUM AND METHOD FOR MANUFACTURING SAME

BACKGROUND OF THE INVENTION

1. Field of the Invention

The present invention relates to an optical information recording medium and a method for manufacturing this medium, and more particularly relates to an optical information recording medium in which a light transmitting layer is disposed on one side of a textured substrate, and a warpage adjusting layer is disposed on the other side.

2. Description of the Related Art

Research into various kinds of optical information recording has been under way for some time in the field of information recording. Optical information recording makes it possible to raise the density, and also allows non-contact recording and reproduction, and is therefore being put to use in a wide range of applications as an inexpensive way to accomplish these goals. Blu-ray discs (BDs) are optical disks that allow higher-density recording than CDs or DVDs. These Blu-ray discs come as single-layer disks having a structure in which an information recording layer is provided on a transparent resin substrate with a thickness of 1.1 mm, and this layer is protected by a light transmitting layer, and as multi-layer disks having a structure in which an intermediate layer is provided between a plurality of information recording layers, and this layer is protected by a light transmitting layer, for example.

However, when a light transmitting layer or a bar-code layer or other such layer of another material is laminated over a transparent resin substrate, the structure ends up being asymmetrical in the thickness direction. Consequently, changes in the environment, such as the temperature or humidity, can warp an optical disk.

In view of this, an optical disk was proposed in the past with which warpage was reduced by using a resin substrate with a groove formed on one side, forming a first UV curable resin film on the side of the substrate on which the groove is formed, and forming, on the other side, a second UV curable resin film that is flat and has a different thickness from that of the first UV curable resin film (see Japanese Laid-Open Patent Application H03-248341, for example).

Nevertheless, as the density of optical disks has risen, less and less warpage is permissible in optical disks because of its relationship to the focal position or the numerical aperture of the optical head. For example, warpage caused by changes in the environment, such as the temperature or humidity, exacerbates such problems as diminished reproduction of an optical disk and recording and reproduction signals, diminished tracking servo performance, and so forth. The inside of the recording and reproduction device (drive) of an optical disk often becomes quite hot, with the temperature rising to about 40 to 50° C., and therefore research has been conducted with the aim of reducing warpage over a range from temperatures near room temperature up to relatively high temperatures of about 100° C.

Meanwhile, even though it has been confirmed that warpage can be effectively prevented over a range from near room temperature up to high temperatures, it was unexpectedly found that warpage can still be very pronounced in the negative direction (the direction of the light projection plane) at temperatures below 0° C.

Usually, when an optical disk is inserted into a drive, the optical pickup used for reproduction learns the focus position according to the warpage of the disk, but if there is a large amount of warpage, the learning function may not be actuated because of the possibility of collision with the disk, which creates problems in the recording and reproduction of information.

Also, there is increasing demand for cost advantages, and there is a need for the development of an optical disk that has a simple structure while still having improved characteristics and avoiding such problems as warpage, and with which raw material and manufacturing costs are kept to a minimum, and a decrease in yield can be prevented by employing a simple manufacturing process.

SUMMARY OF THE INVENTION

The present invention was conceived in light of the above problems, and it is an object thereof to provide an optical information recording medium that has a simple structure and with which warpage is kept to a minimum even under environmental changes over a wide range, including low temperatures under 0° C., and a method for manufacturing this medium.

The optical information recording medium of the present invention includes a substrate having an information recording layer, and a light transmitting layer that covers the information recording layer and is composed of a radiation curable resin, wherein a warpage adjusting layer for adjusting warpage of the light transmitting layer caused by temperature changes is disposed on the opposite side of the substrate from the side on which the information recording layer is formed.

With this optical information recording medium, it is preferable if (1) there is included a temperature region that satisfies the relationship that the coefficient of linear expansion CL of the light transmitting layer<the coefficient of linear expansion SL of the warpage adjusting layer, at temperatures under room temperature, and/or (2) there is included a temperature region that satisfies the relationship that $SL \geqq 1 \times 10^{-5}/°C.$, at temperatures under room temperature, and/or (3) there is included a temperature region that satisfies the relationship that the modulus in tension CM of the light transmitting layer<the modulus in tension SM of the warpage adjusting layer, at temperatures under room temperature, and/or (4) there is included a temperature region that satisfies the relationship that $CM \leqq 1000$ MPa, at temperatures under room temperature, and/or (5) there is satisfied the relationship that the glass transition temperature CT of the light transmitting layer<the glass transition temperature ST of the warpage adjusting layer, and/or (6) there is satisfied the relationship that the thickness CTh of the light transmitting layer>the thickness STh of the warpage adjusting layer, and/or (7) the thickness $STh$ of the warpage adjusting layer $\leqq 50$ µm.

It is also preferable if the warpage adjusting layer is made from a radiation curable resin that includes a urethane acrylate oligomer as a monomer component. Furthermore, it is preferable if an inorganic film for adjusting warpage of the medium caused by humidity is disposed between the substrate and the warpage adjusting layer. It is also preferable if the warpage adjusting layer is composed of a different material from that of the light transmitting layer.

The method of the present invention for manufacturing an optical information recording medium is a method for manufacturing an optical information recording medium used for recording and reproduction and for reproducing recorded information and comprising a substrate having an information recording layer, and a light transmitting layer that covers the information recording layer and is composed of a UV curable resin, said method including a step of forming a warpage adjusting layer for adjusting warpage of the light transmitting layer caused by temperature changes, by a printing method on the opposite side of the substrate from the side on which the information recording layer is formed.

With this method for manufacturing an optical information recording medium, the printing method is preferably screen printing. Also, a pigment may be added to the warpage adjusting layer.

With the optical information recording medium of the present invention, warpage can be prevented with a simple structure even under the required wide range of environmental changes, and particularly at low temperatures below 0° C. Also, the manufacturing process can be prevented from becoming complicated, and an optical information recording medium with which warpage is reliably kept to a minimum and yield can be increased can be manufactured by a simple method.

DETAILED DESCRIPTION OF THE INVENTION

Figure 1:
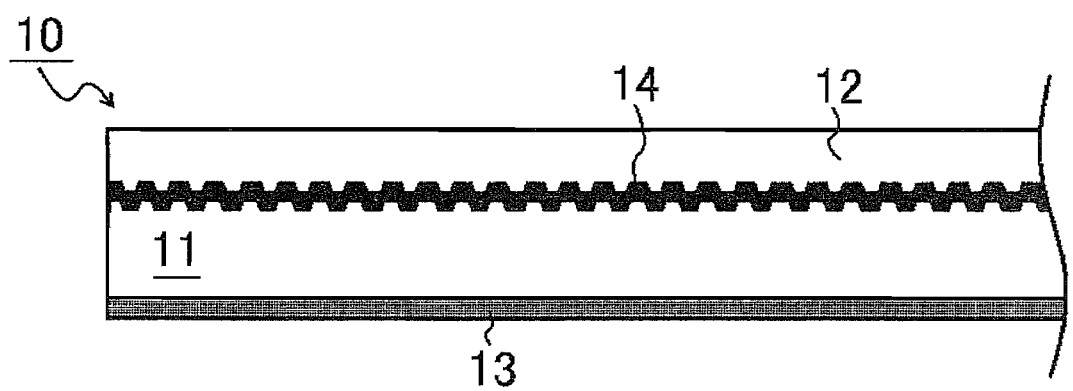
FIG. 1 is a simplified cross section of the main components, illustrating an embodiment of the optical information medium of the present invention.

As shown in FIG. 1, the optical information recording medium of the present invention comprises at least a substrate 11, an information recording layer 14 formed on one side of the substrate 11, a light transmitting layer 12 that is formed on one side (e.g. a first side) of the substrate 11 so as to cover the information recording layer 14, and a warpage adjusting layer 13 formed on the other side (e.g. a second side) of the substrate 11.

The substrate usually has a center hole, texturing (spiral grooves, rows of pits, etc.) is formed on one main side, and an information recording layer is formed on the main side on which the texturing is formed. There are no particular restrictions on the material from which the substrate is made, but it is favorably one that can ensure adequate mechanical strength, and is preferably composed of a resin, for example. From the standpoints of workability, optical characteristics, and so forth, examples of this resin include polycarbonate resins, polyolefin resin, and acrylic resins (such as PMMA). There are no particular restrictions on the thickness, size, shape, etc., of the substrate, but one that is about 1.1 mm thick and is in the form of a disk with an outside diameter of about 120 mm is usually used.

The information recording layer that is formed on the substrate may be a rewritable recording film, a write-once recording film, or a reproduction-only reflective film whose main component is aluminum, silver, or the like. The information recording layer may optionally include a dielectric film, a heat absorbent film, or the like in addition to the recording film, and may also have a structure in which a reflective film is laminated. One or more information recording layers may be used. If there are two or more information recording layers, it is preferable for an intermediate layer, a spacer, or another such layer for separating the information layers to be included between these layers.

The texturing (grooves and/or pits, etc.) may be formed separately from the substrate and applied to the substrate, or may be formed simultaneously during the formation of the substrate itself. In the latter case, the texturing can be formed, for example, simultaneously in the formation of the substrate by injection molding using a stamper that is known in this field (see Japanese Laid-Open Patent Applications Nos. 2003-263794, 2005-100597, etc.). The depth of the grooves is about 10 to 40 nm, and the pitch is about 0.2 to 0.4 μm.

The light transmitting layer is formed on one side of the substrate on which the information recording layer is formed, so as to cover the information recording layer. The light transmitting layer, for example, transmits a laser beam used for information recording or reproduction, and may be composed of a radiation curable resin. The light transmitting layer may have a laminated structure, but preferably has a single-layer structure. A hard coating layer (about 0.5 to 10 μm thick, for example) may be further formed on the surface of the light transmitting layer (cover layer).

The "radiation" referred to here includes electromagnetic waves, such as infrared rays, visible light rays, ultraviolet rays, and X rays. "Transmit" means that approximately 75% or more (and preferably 80% or more) of the light passes through at the film thickness in use. The radiation curable resin is preferably a UV curable resin, and particular examples include acrylic, methacrylic, urethane-based, epoxy-based, and other such UV curable resins.

When a hard coating layer is further formed over the surface of the light transmitting layer (cover layer), and when the light transmitting layer has a laminated structure, it is particularly favorable for the coefficient of linear expansion, elastic modulus, and/or glass transition temperature of the layers to be substantially the same, and preferably to be within about ±20%.

There are no particular restrictions on the thickness of the light transmitting layer, but usually it is about 75 to 100 μm.

When a hard coating layer is further formed over the surface of the light transmitting layer, it is preferable for the combined thickness of the light transmitting layer and the hard coating layer to be within this range.

The warpage adjusting layer is formed on the opposite side of the substrate from the side on which the information recording layer is formed, and its purpose is to adjust the warpage of the light transmitting layer produced by temperature changes, and reduce warpage of the light transmitting layer over a wide range of temperatures of about −30° C. to 25° C., and preferably about −30° C. to 30° C., and more preferably about −31° C. to 35° C., and in turn reduce warpage of the optical information recording medium.

The warpage adjusting layer may include a radiation curable resin, examples of which include acrylic, methacrylic, urethane-based, epoxy-based, and other such resins. Because the warpage adjusting layer itself does not generally contribute any specific performance to the optical information recording medium, it is preferably as thin as possible while still being able to effectively reduce warpage of the optical information recording medium. Therefore, for a sufficient warpage adjusting function to be achieved even with a film that is thinner than the light transmitting layer, which is a cause of warpage, the warpage adjusting layer is preferably formed from a material that is different from the material that makes up the light transmitting layer. For instance, a material containing a urethane resin is suitable, and a radiation curable resin originating in a urethane acrylate monomer or oligomer is preferable.

Also, the bonding state during photopolymerization must be taken into account with this material in order to adjust the coefficient of linear expansion, and it is preferable for the material to include not just urethane acrylate, but also a monomer component that can be copolymerized with the urethane acrylate monomer or oligomer. To increase the elastic modulus, it is preferable to blend/polymerize so that the molecular weight of the urethane acrylate serving as the base will be larger, for example, and to increase the crosslinking density after curing.

A urethane acrylate can usually be synthesized by subjecting a polyisocyanate, a hydroxy group-containing (meth)acrylate compound, and a polyol to a urethanation reaction. An example of a polyisocyanate is an alicyclic diisocyanate compound. Hexamethylene diisocyanate, hydrogenated xylene isocyanate, or the like may also be used. Examples of hydroxy group-containing (meth)acrylate compounds include hydroxymethyl acrylate and hydroxyethyl acrylate. Examples of polyols include ethylene glycol, which is an ethylenic unsaturated compound.

These components may be used alone, or two or more may be used together. Also, a resin that contributes to the elastic modulus and so forth may be mixed with a resin that contributes to the shrinkage and so forth, and two or more kinds of urethane acrylate may be used. To adjust shrinkage and so forth, it is preferable to use hexamethylene diisocyanate, hydrogenated xylene isocyanate, or the like as the polyisocyanate.

An acrylate monomer is preferably used, for example, as the monomer component that can be copolymerized with the urethane acrylate monomer or oligomer. As discussed above, this is because it will be easier to efficiently adjust the coefficient of linear expansion of the material that makes up the warpage adjusting layer. More specifically, examples include tricyclodecane dimethanol diacrylate, propoxylated bisphenol A diacrylate, and other such diacrylate monomers; and phenoxydiethylene glycol acrylate, acryloyloxyethylsuccinic acid, and other such monoacrylates. These may be used alone, or two or more kinds may be used together. These monomer components can be used in an amount of about 50 to 100 wt % with respect to the urethane acrylate monomer or oligomer.

Also, the resin that makes up the warpage adjusting layer preferably contains a photopolymerization initiator. There are no particular restrictions on the photopolymerization initiator, and any known type can be used, but a urethane-based acrylate can be used to particular advantage, examples of which include 1-hydroxycyclohexyl phenyl ketone and benzophenone. The photopolymerization initiator can be used in an amount of about 0 to 10 wt % with respect to the urethane acrylate monomer or oligomer.

The material that makes up the warpage adjusting layer may also contain other materials for imparting functions other than warpage adjustment. For instance, to impart functions such as improving the appearance, preventing static charging, and absorbing UV rays, it is possible to add pigments of various colors (for example, a white ink can be obtained by adding a white pigment), fillers, antistatic agents, anti-UV agents, silane coupling agents, leveling agents, polymerization inhibitors, light stabilizers, antioxidants, surface lubricants, and various other kinds of additives. These additives can be any that are known in this field or the field of resins. The amounts in which the additives are contained can be set so as not to hinder the originally intended functions. Also, rather than these additives being included in the warpage adjusting layer, these additives may be disposed as one or more separate layers on the substrate side or the opposite side of the warpage adjusting layer.

There are no particular restrictions on the thickness STh of the warpage adjusting layer, but it is usually about 10 to 100 μm. In particular, this thickness is preferably less than the thickness CTh of the light transmitting layer, and preferably 50 μm or less, for example. This is because it simplifies the manufacturing process, reduces the raw material cost, and minimizes the effect on the originally intended function of the optical information recording medium.

With the present invention, the above-mentioned warpage adjusting layer serves to reduce warpage in the light transmitting layer and, in turn, in the optical information recording medium, and the characteristics of the warpage adjusting layer are particularly important in combination with the thickness, material and position of the light transmitting layer.

The most important characteristic of this warpage adjusting layer is its coefficient of linear expansion. This is because whether the coefficient of linear expansion CL of the light transmitting layer or the coefficient of linear expansion SL of the warpage adjusting layer is larger, and the difference thereof, are the most dominant factors in determining the direction and extent of warpage. Therefore, for example, the warpage adjusting layer preferably includes at least a temperature region that satisfies the relationship that the coefficient of linear expansion CL of the light transmitting layer<the coefficient of linear expansion SL of the warpage adjusting layer, at temperatures under room temperature (25° C.). It is particularly to reduce or cancel out the warpage of the light emitting layer in a low temperature region. More preferably, it includes at least a temperature region in which $SL \geqq 1 \times 10^{-5}/°$ C., at temperatures below room temperature. This is because warpage can be reduced more effectively for any kind of light transmitting layer formed in a standard way. At temperatures below room temperature, it is even more preferable if $SL > 5 \cdot 10^{-5}/°$ C.

In addition, it is preferable if CL>SL at temperatures at or above room temperature. Usually, when the temperature and humidity characteristics of a medium are taken into account, first the material of the thicker light transmitting layer is determined. This is because changes in warpage when there are sudden temperature changes, such as when the environment changes from about 25° C. to 60° C., are closely related to the material characteristics of the light transmitting layer. Here, because the light transmitting layer greatly expands when there is a sudden change in temperature, there is a large amount of warpage on the substrate side. If the coefficient of linear expansion SL of the warpage adjusting layer is increased in this state, there is the possibility that this will exacerbate the change in the light transmitting layer, so selecting the material for the light transmitting layer becomes more difficult. However, when CL<SL at temperatures under room temperature, and CL>SL at temperatures at or above room temperature, the effect of the warpage adjusting layer becomes apparent at low temperatures, and conversely, at high temperatures, the change in the light transmitting layer is not exacerbated. For instance, at temperatures at or above room temperature, it is preferable if $CL>3\times10^{-4}/°$ C. Also, it is preferable if $SL<3\times10^{-4}/°$ C., and more preferable if $SL>1\times10^{-4}/°$ C.

As for the magnitude of the above-mentioned coefficient of linear expansion, it is preferable for the elastic modulus of the light transmitting layer and the elastic modulus of the warpage adjusting layer to be about the same (e.g., the difference between them is approximately 1000 MPa or less). This is because if there is too great a difference in elastic modulus between the two, there will be little adjustment of warpage due to the relationship of just the coefficient of linear expansion.

The warpage adjusting layer preferably includes at least a temperature region that satisfies the relationship that the modulus in tension CM of the light transmitting layer<the modulus in tension SM of the warpage adjusting layer. This is because warpage of the light transmitting layer will be reduced or cancelled out better, particularly at low temperatures. More preferably, it includes at least a temperature region in which CM≦1000 MPa, at temperatures below room temperature. This is because warpage can be reduced more effectively. SM preferably satisfies SM>500 MPa, and more preferably satisfies SM≧1000 MPa.

In addition, it is preferable if CM>SM at temperatures at or above room temperature. As discussed above, this is so that the warpage change in the light transmitting layer with respect to temperature will not be exacerbated, and when the elastic modulus is high, there is an effect just as when the coefficient of linear expansion is large. Therefore, it is difficult to select the material of the light transmitting layer. Accordingly, when CM<SM at temperatures under room temperature, and CM>SM at temperatures at or above room temperature, the effect of the warpage adjusting layer becomes apparent at low temperatures, and conversely, at high temperatures, the change in the light transmitting layer is not exacerbated. For instance, at temperatures at or above room temperature, it is preferable if CM≧1000 MPa. It is more preferable if SM<1000 MPa, and even more preferable if SM≦about 500 MPa.

The warpage adjusting layer preferably satisfies the relationship that the glass transition temperature CT of the light transmitting layer<the glass transition temperature ST of the warpage adjusting layer. This is because control is easier at a higher glass transition temperature when the constituent material increase the coefficient of linear expansion or elastic modulus. The crosslinking density is generally raised to increase the elastic modulus, but since this tends to result in a higher glass transition temperature, restrictions are imposed on the selection of the material. For example, it is preferable if CT≦80/° C. Also, it is preferable if ST>80/° C., and more preferable if ST>120/° C.

In the above, when a hard coating layer or the like is laminated over the light transmitting layer (cover layer), it is possible that the hard coating layer or the like will be much thinner than the light transmitting layer, so the light transmitting layer should be used as a reference in considering the coefficient of linear expansion, the elastic modulus, and the glass transition temperature.

With the optical information recording medium of the present invention, at least any of the above-mentioned coefficient of linear expansion, elastic modulus, glass transition temperature, etc., may exhibit the specific values discussed above, but by combining two or more or all of these, warpage can be kept to a minimum under environmental changes over a wide [temperature] range, from −30° C. to 35° C., density can be higher, and the medium can be applied under more stringent specified conditions.

With the optical information recording medium of the present invention, an inorganic film may be further disposed between the substrate and the warpage adjusting layer. This inorganic film may be a film that functions to adjust warpage of the medium due to humidity, to reflect light, and so forth. Examples of materials of this inorganic film include ZnS. $SiO_2$, $Si_3N_4$, and aluminum. There are no particular restrictions on the film thickness, but about 5 nm or greater is suitable, for example. The inorganic film may be formed by sputtering or the like, or an inorganic film may be formed independently and then affixed with an adhesive agent or the like.

With the present invention, the warpage adjusting layer in the optical information recording medium can be formed, for example, by spin coating, screen coating, gravure coating, bar coating, roll coating, spray coating, or another such method that is known in this field, and then drying the coating. From the standpoint of simplicity of the manufacturing process, it is especially favorable to form it by a printing method. Examples of printing methods include relief printing (flexographic printing), lithography (offset printing), intaglio printing (gravure printing), and screen printing. Of these, screen printing is preferred in that a warpage adjusting layer can be easily formed in the required thickness.

Embodiments of the constitution of the optical information recording medium of the present invention, and of the method for manufacturing this medium, will now be described.

Embodiment 1

Optical Information Recording Medium 1

As shown in FIG. 1, the optical information recording medium of the present invention has an information recording layer 14 on one main side of a substrate 11 in which a center hole (not shown) has been formed, and a light transmitting layer 12 that covers this information recording layer 14. A warpage adjusting layer 13 is formed on the opposite side of the substrate 11 of this optical information recording medium from the main side on which the information recording layer 14 is formed. A clamping region where the optical information recording medium 10 is clamped is disposed around the inner periphery of the region where the information recording layer 14 is formed.

Embodiment 2

Optical Information Recording Medium 20a

Figure 2A:
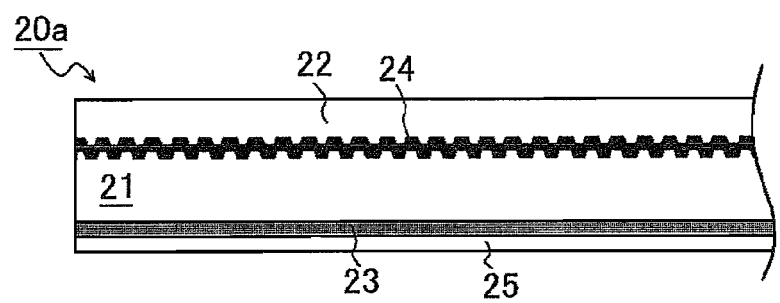
FIG. 2 is a simplified cross section of the main components, illustrating another embodiment of the optical information medium of the present invention.

As shown in FIG. 2A, this optical information recording medium 20a has an information recording layer 24 on one main side of a substrate 21, and a light transmitting layer 22 that covers this information recording layer 24. A warpage adjusting layer 23 is formed on the opposite side of the substrate 21 of this optical information recording medium from the main side on which the information recording layer 24 is formed. A milky white ink layer 25 is formed, for example, so as to cover the warpage adjusting layer 23.

Embodiment 3

Optical Information Recording Medium 20b

Figure 2B:
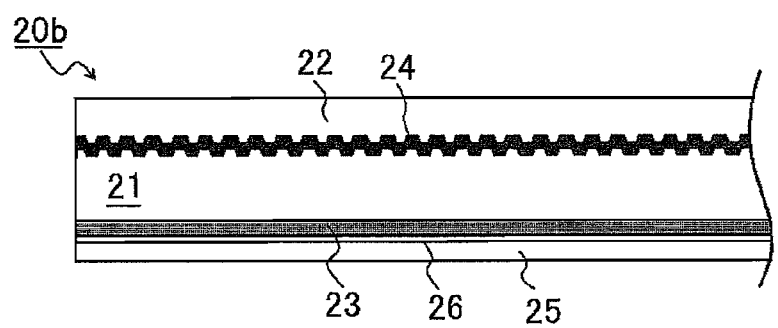

As shown in FIG. 2B, this optical information recording medium 20b has a warpage adjusting layer 23 formed on the opposite side of the substrate 21 from the main side on which the information recording layer 24 is formed. The configuration is the same as that of the optical information recording medium 20a discussed above, except that an inorganic film 26 composed of ZnS.SiO$_2$ and a milky white ink layer 25 are formed in that order so as to cover the warpage adjusting layer 13.

Embodiment 4

Optical Information Recording Medium 30

Figure 3:
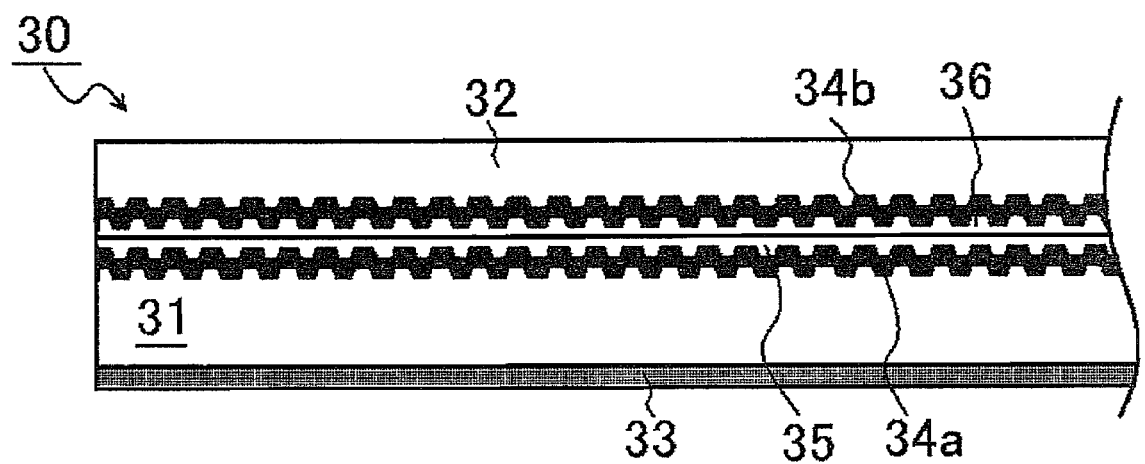
FIG. 3 is a simplified cross section of the main components, illustrating yet another embodiment of the optical information medium of the present invention.

As shown in FIG. 3, this optical information recording medium 30 has a first information recording layer 34a formed on one main side of a substrate 31, a second information recording layer 34b is laminated via an intermediate layer 35 and an adhesive layer 36, and a light transmitting layer 32 covers this second information recording layer 34b. Also, a warpage adjusting layer 33 is formed on the opposite side of the substrate 31 of this optical information recording medium 30 from the main side on which the information layers 34 are formed.

Embodiment 5

Production of Optical Information Recording Medium-1

First, a substrate with a thickness of 1.1 mm, a diameter of 120 mm, and a center hole diameter of 15 mm, for example, is produced by the injection molding of a polycarbonate, using a stamper on which specific texturing has been formed. A reflective film composed of silver and having a thickness of 40 nm, for example, is formed by sputter deposit method on one side of the resulting substrate, and an information recording layer is formed on one side of the substrate.

Figure 4A:
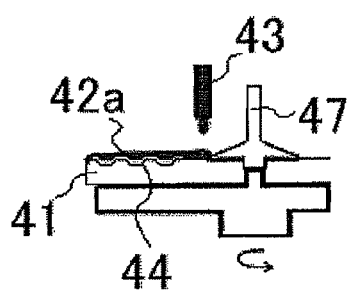
FIG. 4 is a process diagram consisting of simplified cross sections of the main components, illustrating an embodiment of the method of the present invention for manufacturing an optical information medium.

Next, as shown in FIG. 4A, for example, a substrate 41 on one side of which has been formed an information recording layer 44 is placed in a spin coating apparatus with the information recording layer 44 facing up, and a cap 47 is brought down to cover the area near the center hole so that it will not be coated with resin (discussed below). After this, the distal end of a nozzle 43 is disposed at the outer periphery of the cap 47, the substrate is coated with 1 g of a resin 42a composed of urethane acrylate with a viscosity of 3000 cps, for example, and this is spun and spread out for 1.5 seconds at 8000 rpm.

Figure 4D:
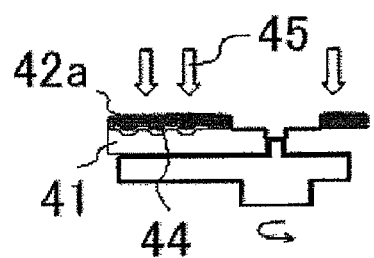
Figure 4B:
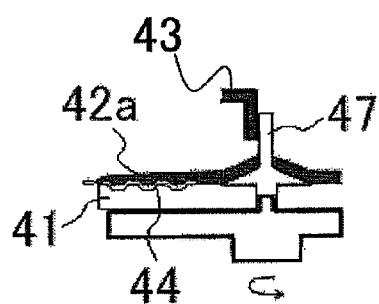

Then, as shown in FIG. 4B, the distal end of the nozzle 43 is moved to the center of the substrate 41, 2 g of the same resin 42a is applied from above the cap 47, and this is spun and spread out for 1.5 seconds at 4000 rpm. After this, as shown in FIG. 4C, the substrate 41 is irradiated from above with ultraviolet rays 45 from a flash lamp, and the substrate 41 is rotated at 2000 rpm, the result being that the resin 42a is flung off and partially cured instantly, then the substrate 41 is rotated at 2000 rpm as shown in FIG. 4D while being irradiated with the ultraviolet rays 45 from a flash lamp, and the resin 42a is completely cured to form a first resin layer.

Figure 4E:
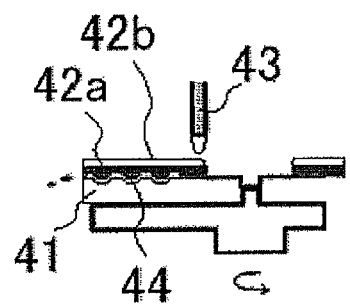
Figure 4C:
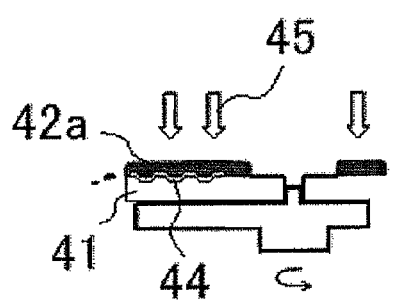

As shown in FIG. 4E, the distal end of the nozzle 43 is disposed over the first resin layer, a resin 42b composed of a polyfunctional urethane acrylate with a viscosity of 50 cps, for example, is applied in an amount of 2 g, and this is spun and spread out for 2 seconds at 8000 rpm.

Figure 4F:
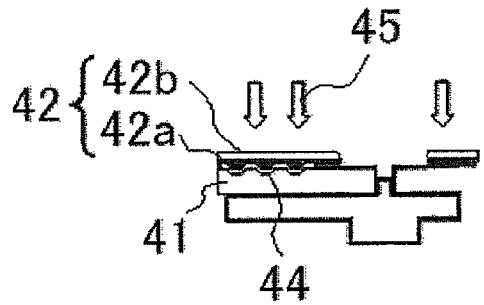

Next, as shown in FIG. 4F, the substrate 41 is irradiated from above with ultraviolet rays 45 from a UV lamp to cure the resin 42b and form a light transmitting layer 42 with a thickness of 100 μm. This method is discussed in Japanese Laid-Open Patent Application 2005-259331, for example.

Figure 5A:
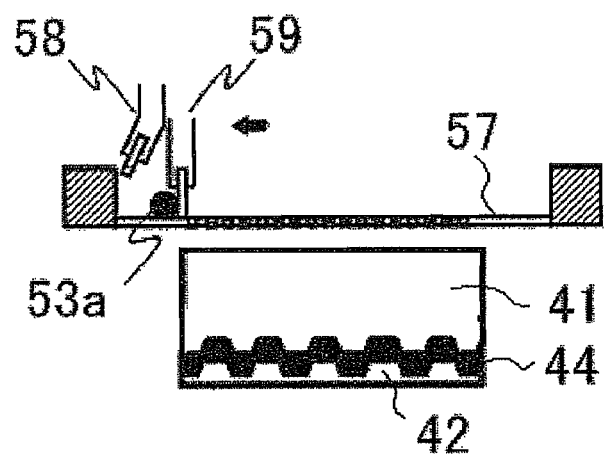
FIG. 5 is a process diagram consisting of simplified cross sections of the main components, illustrating an embodiment of the method of the present invention for manufacturing an optical information medium.

A warpage adjusting layer is then formed as follows on the back side of the substrate 41 on which the information recording layer 44 and the light transmitting layer 42 have been formed (the side on which the information recording layer 44, etc., are not formed). First, as shown in FIG. 5A, the substrate 41 is placed in a screen printing machine and a screen 57 is coated with a resin 53a having a viscosity of 1500 cps, for example, using a scraper 59. The screen 57 used here is masked ahead of time everywhere except where it is supposed to be coated with the resin 53a. This resin 53a is preferably adjusted to a viscosity of about 300 to 10,000 cps, and more preferably about 1000 to 6000 cps, so that it can be used more easily in this printing step. This allows the thickness to be precisely adjusted to about 5 to 30 μm in the printing step.

Figure 5B:
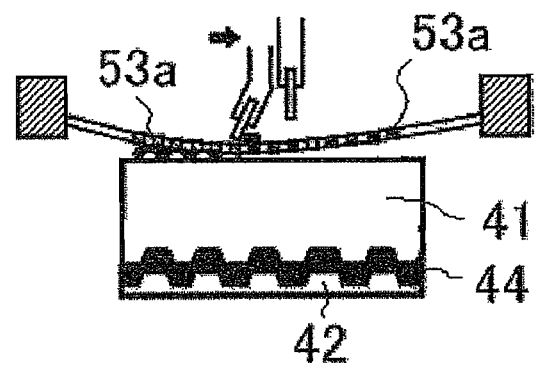
Figure 5C:
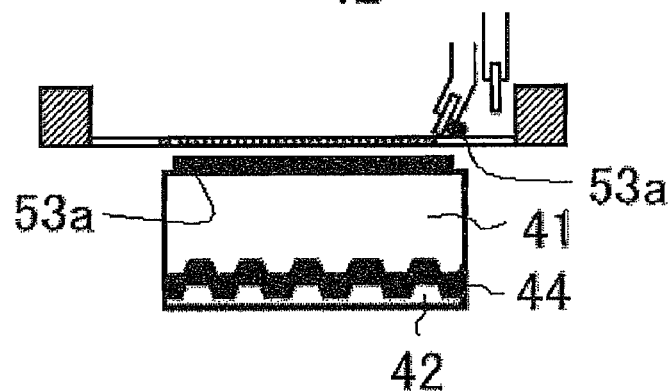
Figure 5D:
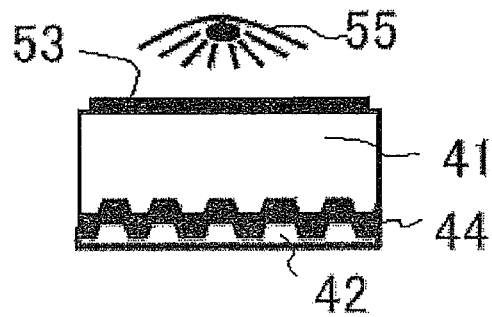

Next, as shown in FIG. 5B, a squeegee 58 is slid over the substrate 41 while pressure is applied to the screen 57. As a result, as shown in FIG. 5C, the substrate 41 is printed with the resin 53a everywhere except in the masked region of the screen 57. After this, as shown in FIG. 5D, the substrate 41 printed with the resin 53a is irradiated with UV light 55 to cure the resin 53a and form a warpage adjusting layer.

Embodiment 6

Production of Optical Information Recording Medium-2

Figure 6A:
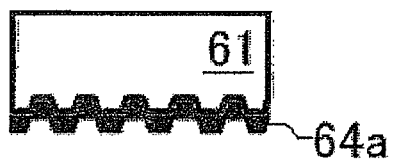
FIG. 6 is a process diagram consisting of simplified cross sections of the main components, illustrating an embodiment of the method of the present invention for manufacturing an optical information medium.
Figure 6B:
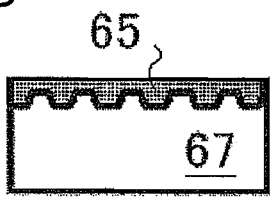

First, as shown in FIG. 6A, a substrate 61 is readied that has the same information layer as above as a first information recording layer 64a. Also, as shown in FIG. 6B, a transfer stamper substrate 67 is formed in the same manner as the substrate 61, using the stamper for producing the substrate 61, but separately from the substrate 61. Since this stamper substrate 67 will be removed later, its thickness may be about 1.1 mm, for example, just as with the substrate 61, but it may instead be about 0.6 mm. The stamper substrate 67 is coated from above with 2 g of a resin of 300 cps by spin coating for 1 second at 3600 rpm, for example, and this coating is cured with radiation to form a transfer layer 65 with a thickness of about 25 μm.

Figure 6C:
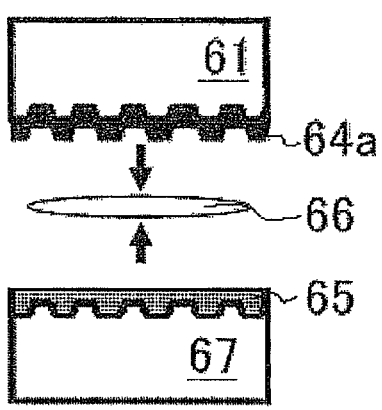
Figure 6D:
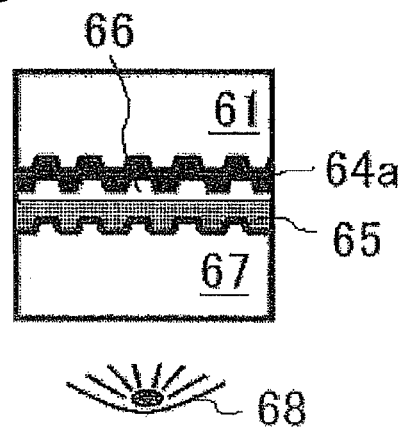
Figure 6E:
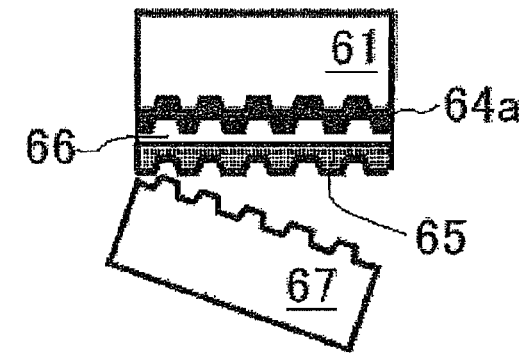

Then, as shown in FIG. 6C, the transfer layer 65 and the first information recording layer 64a of the substrate 61 are stuck together with an adhesive agent 66 in a vacuum (20 mPa), and then irradiated with ultraviolet rays 68 as shown in FIG. 6D to cure the transfer layer 65 and the adhesive agent 66. After this, the stamper substrate is removed as shown in FIG. 6E. The transfer layer 65 and the adhesive agent 66 were used together as an intermediate layer here, but the intermediate layer may instead be formed as a single layer composed of just one kind of resin.

Figure 6F:
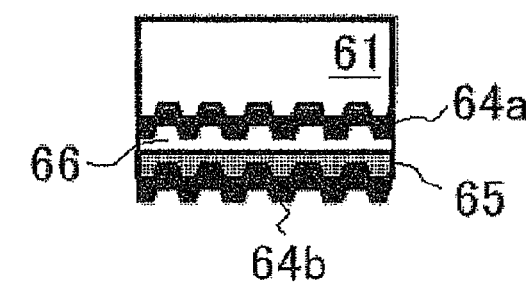
Figure 6G:
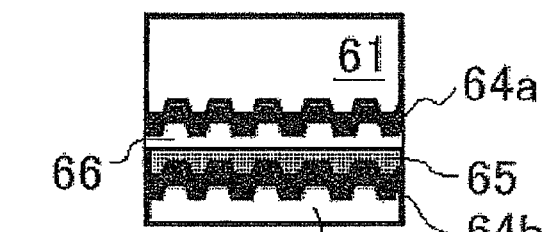
Figure 6H:
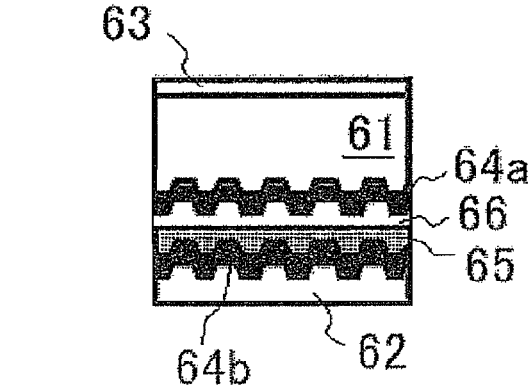

Next, as shown in FIG. 6F, a reflective film of a material containing silver is formed as a second information recording layer 64b in a thickness of about 25 μm over the intermediate layer. Then, just as above, as shown in FIG. 6G, a light transmitting layer 62 with a thickness of about 75 μm is formed over the second information recording layer 64b, and as shown in FIG. 6H, a warpage adjusting layer 63 is formed on the back side of the substrate 61.

Specific working examples of the constitution of the optical information recording medium of the present invention will now be described.

MANUFACTURING EXAMPLE

Manufacture of Resin Constituting Warpage Adjusting Layer

An oligomer can be synthesized by a commonly known urethane acrylate synthesis method. For instance, it can be synthesized by mixing a hydroxy group-containing (meth)acrylate compound and a polyol, heating the mixture to 50° C., and adding a diisocyanate dropwise over a period of a few hours.

Similarly, an urethane acrylate compound is synthesized, for example, by heating a diisocyanate while adding a diol compound dropwise to produce a prepolymer, and then adding a hydroxy group-containing acrylic ester dropwise and heating to about 70° C. to react the isocyanate groups.

The warpage adjusting layer of the present invention was produced using resins A2 to F2 and CA to CF obtained by mixing these several kinds of oligomer with a monoacrylate component and 1-hydroxycyclophenyl ketone (a photopolymerization initiator). The coefficient of linear expansion can be adjusted by selecting the type of oligomer and monomer. The average molecular weight here is about 7000 to 12000. For example, the coefficient of linear expansion with respect to temperature can be varied when the warpage adjusting layer is produced using 2-hydroxylacrylate and when using 6-hydroxylhexyl acrylate for the hydroxy group-containing acrylic ester.

Figure 7:
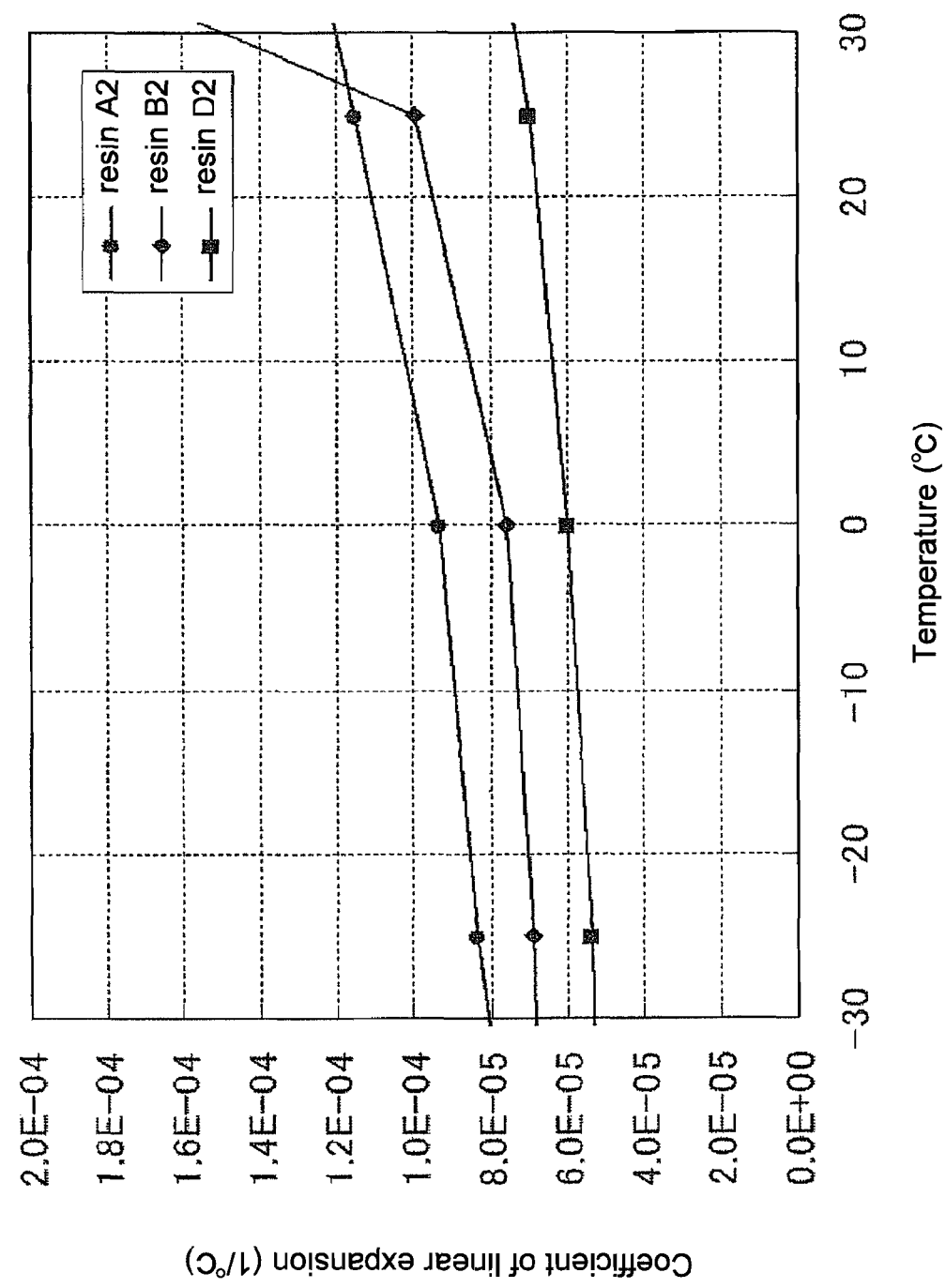
FIG. 7 is a graph of the change in the coefficient of linear expansion versus the change in temperature of the optical information medium of the present invention.

The elastic modulus of the above-mentioned resins A2 to F2 and CA to CF at −30° C./room temperature, the coefficient of linear expansion at −30° C./room temperature, the improvement in warpage, the molecular weight, and the glass transition temperature (Tg) were measured, the results of which are given in Tables 1 and 2 and FIG. 7. An Exstar 6000 TMA/SS stress-strain measurement apparatus made by SII NanoTechnology was used to measure the coefficient of linear expansion and the elastic modulus at room temperature. The test piece was prepared by coating a glass disk with a sample resin in a thickness of 100 μm, curing and then removing the resin from the glass, and cutting the product to a size of 5×10 mm. Molecular weight was measured by finding the average molecular weight by GPC analysis.

WORKING EXAMPLE 1

Optical information recording media having a recording layer with a two-layer structure with the same configuration as the optical information recording medium shown in FIG. 3 were produced using the above-mentioned resins A2 to F2 as the warpage adjusting layer. That is, each medium was configured such that a reflective film containing silver and having a thickness of 40 nm, a transfer layer, an adhesive layer, a reflective film containing silver and having a thickness of 25 nm, and a light transmitting layer were laminated in that order over the texturing of a carbonate (Panlite, made by Teijin) substrate having a thickness of 1.1 mm, a diameter of 120 mm at 0.32 μm pitch, and a center hole diameter of 15 mm and on which texturing that served as information signals had been formed, and a warpage adjusting layer was formed on the opposite side of the substrate from the side with the light transmitting layer. The transfer layer had a thickness of 18 μm and was composed of an acrylic resin (POK100, made by Nippon Kayaku). The adhesive layer had a thickness of 7 μm and was composed of an acrylic adhesive (POK300, made by Nippon Kayaku). The light transmitting layer had a laminar structure comprising a resin film with a thickness of 98 μm and composed of a urethane acrylate resin (POK700, made by Nippon Kayaku) and a resin film with a thickness of 2 μm and composed of a hard coating (SD715, made by Dainippon Ink & Chemicals) composed of a urethane acrylate containing a silicone-type additive. The warpage adjusting layer was a layer with a thickness of 20 μm and composed of the above-mentioned resins A2 to F2.

The improvement in warpage was measured for these media. The improvement in warpage is the amount of improvement in the change in R tilt (a negative value with a reference disk; the difference from this value goes in the positive direction) of an optical information recording medium in which a warpage adjusting layer has been formed, using as a reference an optical information recording medium in which no warpage adjusting layer has been formed, at −30° C. These results are given in Table 1.

TABLE 1

| Resin | Modulus in tension at room temp. | Coefficient of linear expansion at −30° C. | Improvement in warpage (−30° C.) | Molecular weight | Tg (° C.) |
|---|---|---|---|---|---|
| A2 | 2700 MPa | 8E−5 | +1.0° | 7000 | 120 |
| B2 | 2500 MPa | 6E−5 | +0.85° | 6800 | 130 |
| C2 | 3700 MPa | 1E−5 | +0.05° | 12000 | 130 |
| D2 | 3500 MPa | 3E−5 | +0.36° | 11000 | 120 |
| E2 | 3300 MPa | 6E−4 | +1.45° | 10500 | 95 |
| F2 | 3000 MPa | 9E−4 | +1.8° | 9000 | 80 |

It can be seen from the results in Table 1 that at temperatures below room temperature, the coefficient of linear expansion of the warpage adjusting layer is about $1 \times 10^{-5}$/° C. or higher, the improvement in warpage is +0.05° or more, and warpage of the medium can be suppressed. Also, it can be seen that a coefficient of linear expansion of about $3 \times 10^{-5}$/° C. or higher is even more effective, and one of $6 \times 10^{-4}$/° C. or higher is more effective yet. This tendency is not believed to be greatly affected by the thickness of the warpage adjusting layer, but when the light transmitting layer is formed in a thickness of about 70 to 105 μm, for example, warpage can be effectively improved when the warpage adjusting layer is about 10 to 65 μm, and especially about 10 to 50 μm.

WORKING EXAMPLE 2

Optical information recording media having two information recording layers with the same configuration as the optical information recording medium shown in FIG. 3 were produced using the above-mentioned resins A2, B2, and D2 as the warpage adjusting layer. That is, each medium was configured such that a reflective film containing silver and having a thickness of 40 nm, a transfer layer, an adhesive layer, a reflective film containing silver and having a thickness of 25 nm, and a light transmitting layer were laminated in that order over the texturing of a carbonate (Panlite, made by Teijin) substrate having a thickness of 1.1 mm, a diameter of 120 mm at 0.32 μm pitch, and a center hole diameter of 15 mm and on which texturing that served as information signals had been formed, and a warpage adjusting layer was formed on the opposite side of the substrate from the side with the light transmitting layer. The transfer layer had a thickness of 18 μm and was composed of an acrylic resin (POK100, made by Nippon Kayaku). The adhesive layer had a thickness of 7 μm and was composed of an acrylic adhesive (POK300, made by Nippon Kayaku). The light transmitting layer had a laminar structure comprising a resin film with a thickness of 73 μm and composed of a urethane acrylate resin (POK700, made by Nippon Kayaku) and a resin film with a thickness of 2 μm and composed of a hard coating (SD715, made by Dainippon Ink & Chemicals) composed of a urethane acrylate containing a silicone-type additive. The coefficient of linear expansion was $-5.7 \times 10^{-4}$ at room temperature, $2.4 \times 10^{-4}$ at $-30°$ C. (a temperature below room temperature), and $5.9 \times 10^{-4}$ at $50°$ C. (a temperature at or above room temperature), the modulus in tension was 800 MPa at room temperature, 900 MPa at $-30°$ C. (a temperature below room temperature), and 500 MPa at $50°$ C. (a temperature at or above room temperature), and the glass transition temperature was $80°$ C. The warpage adjusting layer was a layer with a thickness of 20 μm and composed of the above-mentioned resins A2, B2, and D2.

Figure 8:
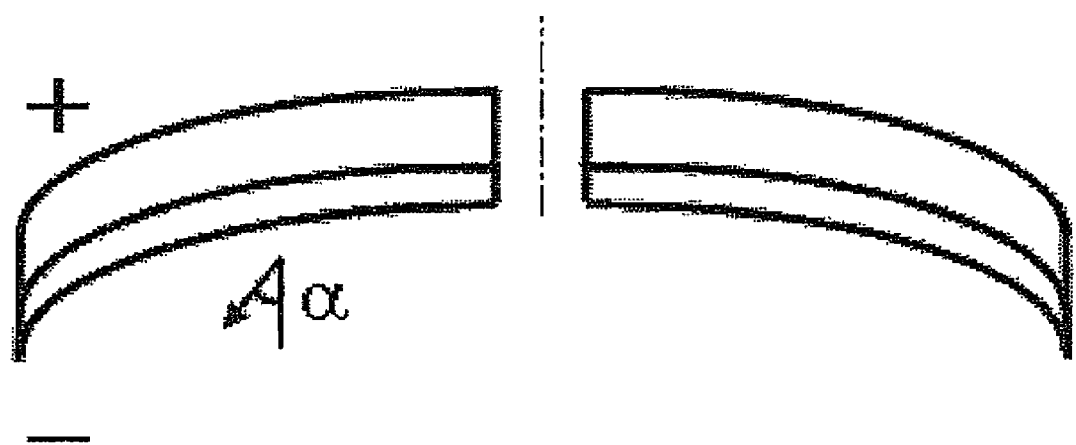
FIG. 8 is a simplified cross section of the main components, illustrating the amount of warpage of the optical information medium of the present invention.

For these media, the amount of change in R tilt (amount of warpage: α angle) was measured at a position of r=58 mm (position at a radius of 58 mm) as shown in FIG. 8 over a range of $-30°$ C. to $25°$ C., when the amount of change in R tilt for the medium at $25°$ C. was 0. Also, optical information recording media were produced as a comparative example in the same manner as in Working Example 1, except that no warpage adjusting layer was formed in the optical information recording medium shown in FIG. 3, and the amount of warpage was measured in the same manner as in Working Example 1. These results are shown in FIG. 9.

Figure 9:
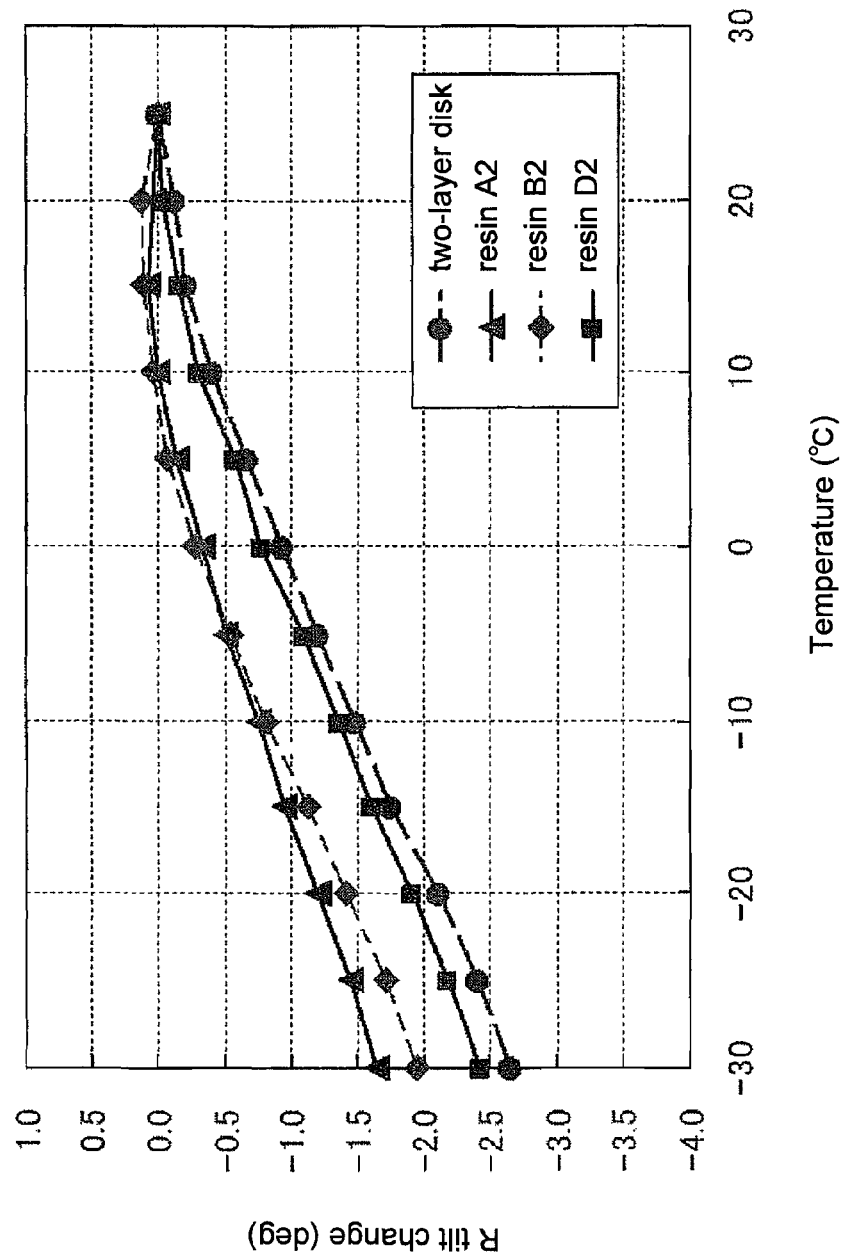
FIG. 9 is a graph of the change in the amount of warpage versus the change in temperature of the optical information medium of the present invention.

It can be seen from the results in FIG. 9 that warpage of the medium can be effectively suppressed when the coefficient of linear expansion is at least about $1 \times 10^{-5}/°$ C. of the resin C2. As the thickness of the warpage adjusting layer increases, the effect of suppressing warpage improves, and it was confirmed that a suppression effect of at least $3 \times 10^{-5}$ is exhibited with a warpage adjusting layer whose thickness is about one-fifth of the thickness (75 μm) of the light transmitting layer.

WORKING EXAMPLE 3

Figure 10:
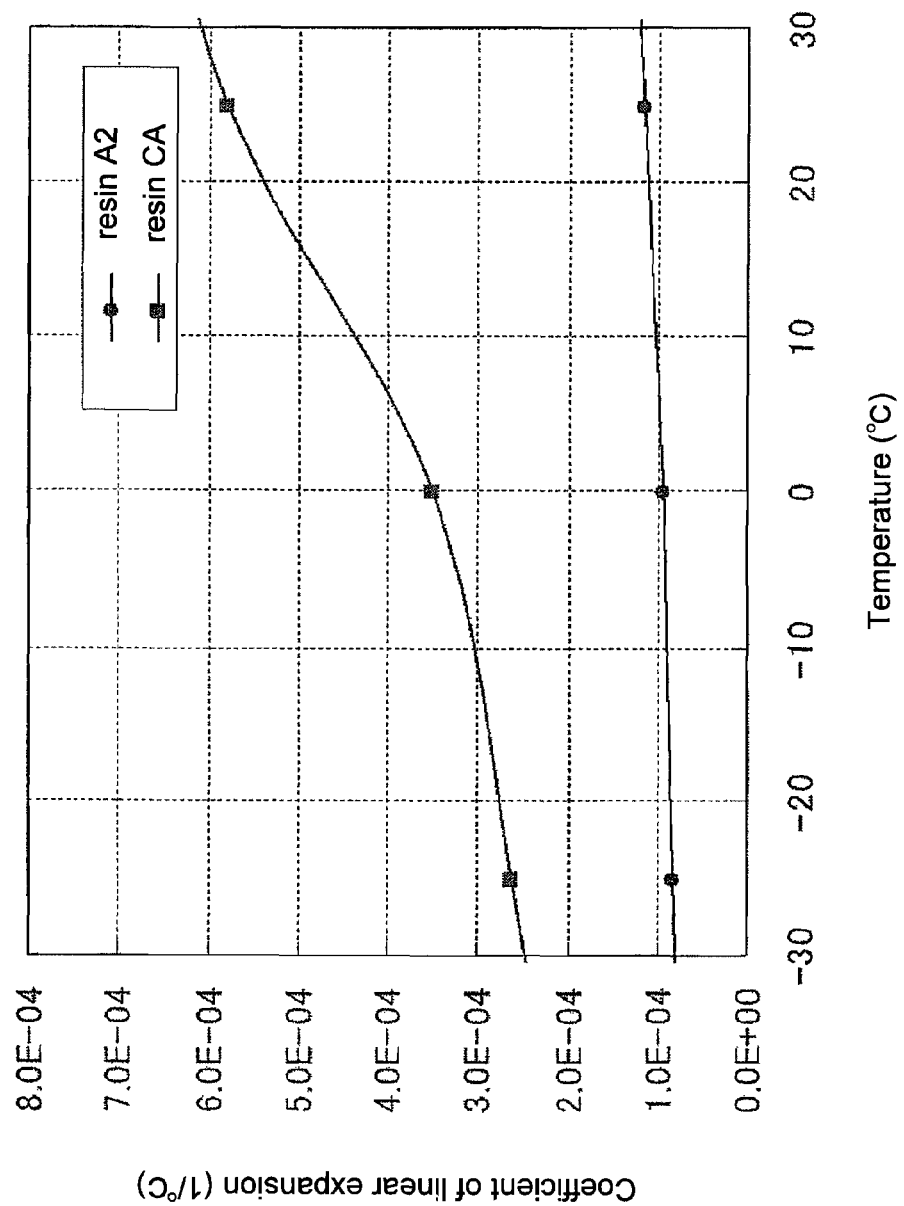
FIG. 10 is a graph of the change in the coefficient of linear expansion versus the change in temperature of the optical information medium of the present invention.
Figure 11:
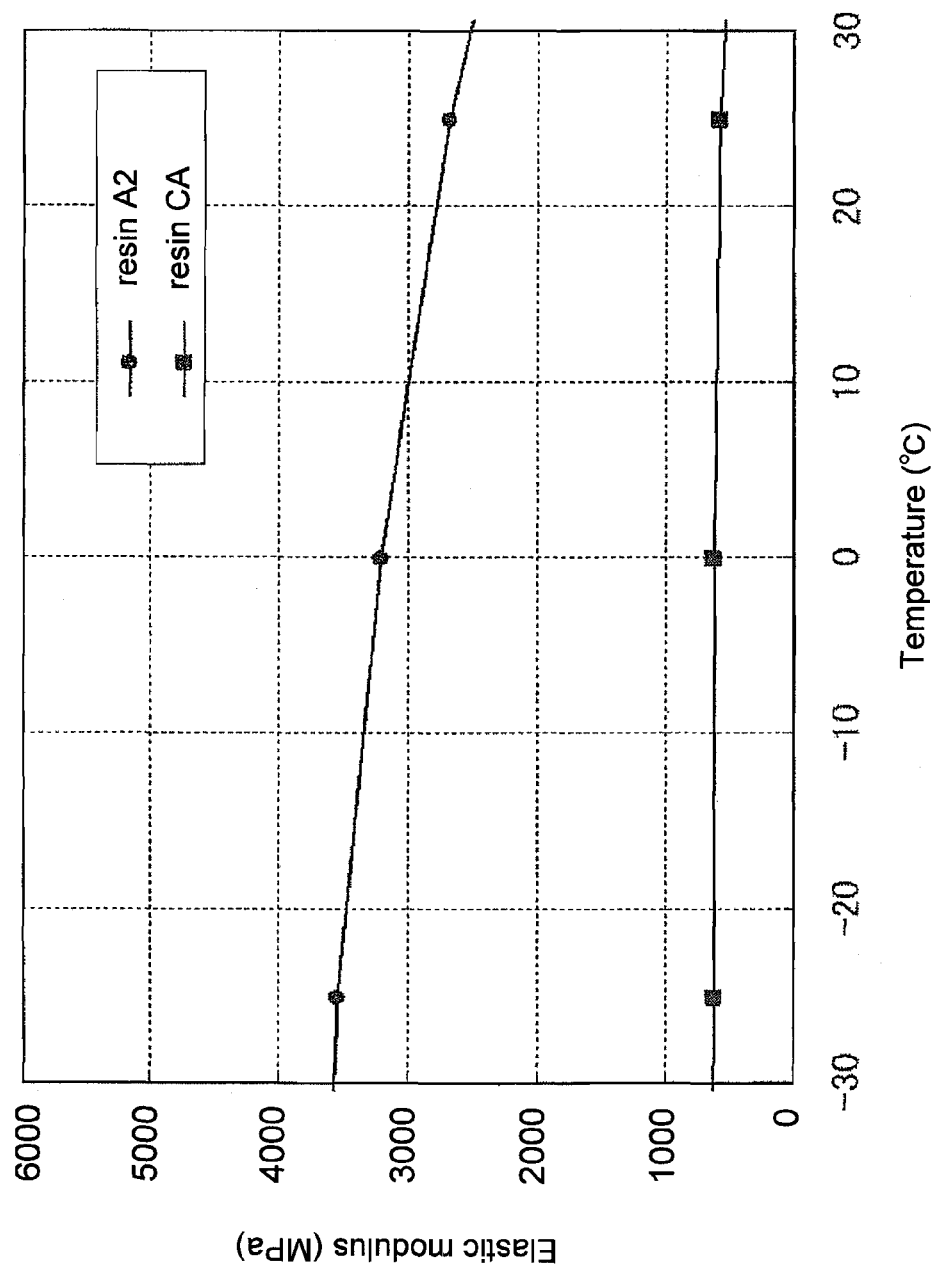
FIG. 11 is a graph of the change in the elastic modulus versus the change in temperature of the optical information medium of the present invention.

FIG. 10 shows the change in the coefficient of linear expansion versus temperature changes for the resins A2 and CA obtained above, while FIG. 11 shows the change in elastic modulus. Optical information recording media having two information recording layers the same as in Working Example 2 were produced using these resins A2 and CA as the warpage adjusting layer, and the R tilt was measured at the position of r=58 mm in the same manner as in Working Example 2.

Figure 12:
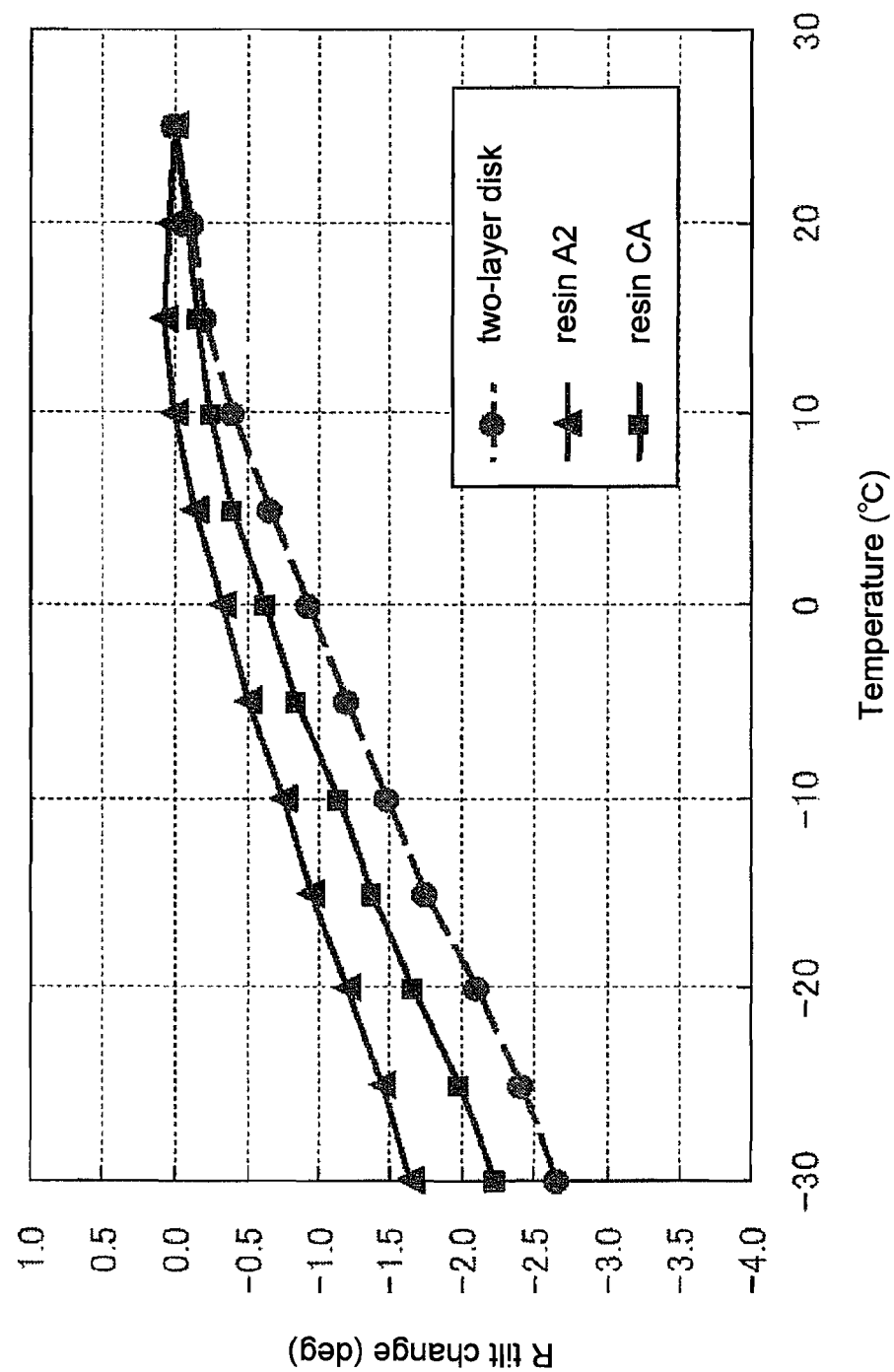
FIG. 12 is a graph of the change in the amount of warpage versus the change in temperature of the optical information medium of the present invention.

As a comparative example, optical information recording media were produced with the same constitution except that no warpage adjusting layer was formed, and the R tilt was measured in the same manner. These results are given in FIG. 12. It can be seen in FIG. 12 that while the coefficients of linear expansion are different by a magnitude of 10, the elastic modulus with resin CA is one-fifth of that with resin A, so there is less effect of improving warpage. That is, even though the coefficient of linear expansion is large, if the elastic modulus is low, there will be little effect of improving warpage, and thus, the higher is the elastic modulus, the better.

WORKING EXAMPLE 4

Optical information recording media having the same two information recording layers as in Working Examples 1 and 2 were produced using the above-mentioned resins CA to CF as the warpage adjusting layer. The improvement in warpage was measured for these media in the same manner as in Working Example 1. The results are given in Table 2.

TABLE 2

| Resin | Modulus in tension at $-30°$ C. | Modulus in tension at room temp. | Coefficient of linear expansion at room temp. | Improvement in warpage ($-30°$ C.) | Molecular weight | Tg (° C.) |
|---|---|---|---|---|---|---|
| CA | 750 MPa | 577 MPa | 6E−4 | +0.45° | 9000 | 130 |
| CB | 170 MPa | 100 MPa | 5.8E−4 | +0.05° | 8600 | 100 |
| CC | 504 MPa | 300 MPa | 5.8E−4 | +0.18° | 8800 | 110 |
| CD | 1650 MPa | 1000 MPa | 5.9E−4 | +0.66° | 9400 | 130 |
| CE | 5000 MPa | 3300 MPa | 6E−4 | +1.45° | 10500 | 130 |
| CF | 9800 MPa | 8000 MPa | 4E−4 | +1.75° | 11000 | 130 |

It can be seen from Table 2 that warpage of the medium can be suppressed if the elastic modulus at room temperature is at least 100 MPa, and that about 300 MPa or higher is more effective, and about 1000 MPa or higher is even more effective. The effect is particularly pronounced when the coefficient of linear expansion is substantially constant.

WORKING EXAMPLE 5

A white ink was prepared by using 100 weight parts of the CE resin produced in Table 2 as a binder, and adding to this 30 weight parts of titanium oxide as a white pigment. Optical information recording media with the same configuration as that shown in FIG. 2A were produced in the same manner as in Working Example 1, except that the opposite side of the warpage adjusting layer from the substrate side was coated with this white ink by screen printing, and this coating was irradiated with UV to form an ink layer with a thickness of about 20 μm. The media thus obtained were evaluated in the same manner as in Working Example 1, and the obtained results were substantially the same as those in Working Example 1.

WORKING EAMPLE 6

Optical information recording media were produced and evaluated in the same manner as in Working Example 1, except that 30 weight parts of titanium oxide (used as a white pigment) were added to 100 weight parts of the resin constituting the warpage adjusting layer, which gave the same results as in Working Example 1.

WORKING EXAMPLE 7

Optical information recording media were produced in the same manner as in Working Example 5, except that a film composed of the resin CE of Table 2 with a thickness of 20 μm was formed as an inorganic film between the warpage adjusting layer and the ink layer. The media thus obtained were evaluated in the same manner as in Working Example 1, which gave substantially the same results as in Working Examples 1 and 5.

WORKING EXAMPLE 8

Optical information recording media having an information recording layer with a single-layer structure which is the same configuration as that of the optical information recording medium shown in FIG. 1 were produced using the above-mentioned resins CD and CF as the warpage adjusting layer. That is, each medium was configured such that a reflective film containing silver with a thickness of 40 nm and a light transmitting layer were laminated in that order over the texturing of a carbonate (Panlite, made by Teijin) substrate having a thickness of 1.1 mm, a diameter of 120 mm, at 0.32 μm pitch, and a center hole diameter of 15 mm and on which texturing that served as information signals had been formed, and a warpage adjusting layer was formed on the opposite side of the substrate from the side with the light transmitting layer. The light transmitting layer had a laminate structure (total thickness: 100 μm) comprising a resin film with a thickness of 98 μm and composed of a urethane acrylate resin (POK700, made by Nippon Kayaku) and a resin film with a thickness of 2 μm and composed of a hard coating (SD715, made by Dainippon Ink & Chemicals) composed of a urethane acrylate containing a silicone-type additive. The warpage adjusting layer was a layer with a thickness of 20 μm and composed of the above-mentioned resins CD and CF.

Figure 13:
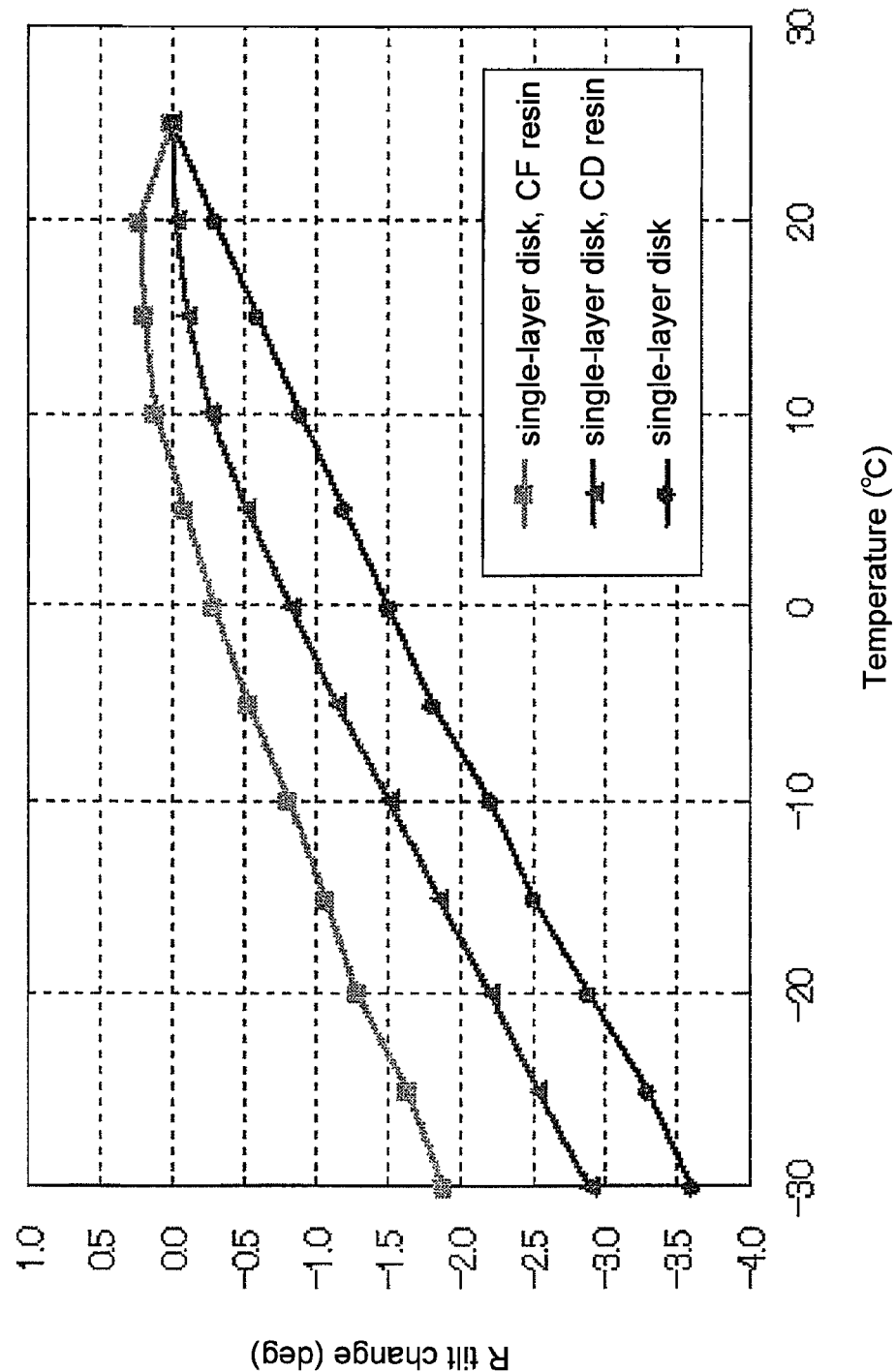
FIG. 13 is a graph of the change in the amount of warpage versus the change in temperature of the optical information medium of the present invention.

For these media, the amount of change in R tilt (amount of warpage: α angle) was measured at a position of r=58 mm as shown in FIG. 13 over a range of −30° C. to 25° C., when the amount of change in R tilt for the medium at 25° C. was 0. Also, optical information recording media were produced as a comparative example in the same manner as in Working Example 1, except that no warpage adjusting layer was formed in the optical information recording medium shown in FIG. 1, and the amount of warpage was measured in the same manner. These results are shown in FIG. 13.

It can be seen from the results in FIG. 13 that warpage of the medium can be effectively suppressed just as in Working Example 4 (two-layer disk configuration). Specifically, it can be seen that the effect of suppressing warpage in the medium is better when a warpage adjusting layer is formed using the resin CF, which has a higher modulus in tension, than when the resin CD is used. Furthermore, a configuration up to only a two-layer structure was described as an example in these embodiments and working examples, but the present invention can, of course, also be applied to multilayer structures in which there are three or more information recording layers, and a similar effect can be obtained.

The optical information recording medium of the present invention can be applied to all media, such as Blue-ray discs, DVD, CD, MD, and MO.

This application claims priority to Japanese Patent Application No. 2006-338056. The entire disclosure of Japanese Patent Application No. 2006-338056 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An optical information recording medium, comprising:
a substrate having a first side with an information recording layer formed thereon and a second side opposite the first side;
a light transmitting layer covering the information recording layer and being composed of a radiation curable resin;
a warpage adjusting layer for adjusting warpage of the light transmitting layer caused by temperature changes, the warpage adjusting layer being on the second side of the substrate; and
an inorganic film for adjusting warpage caused by humidity, the inorganic film being disposed between the substrate and the warpage adjusting layer,
wherein said optical information recording medium includes at least a first temperature region that satisfies the relationship that the coefficient of linear expansion (CL) of the light transmitting layer<the coefficient of linear expansion (SL) of the warpage adjusting layer, at temperatures under 25° C.

2. The optical information recording medium according to claim 1, including at least a second temperature region that satisfies the relationship that the coefficient of linear expansion (SL) of the warpage adjusting layer$\geq 1 \times 10^{-5}$/° C., at temperatures under 25° C.

3. The optical information recording medium according to claim 1 including at least a second temperature region that satisfies the relationship that the modulus in tension (CM) of the light transmitting layer<the modulus in tension (SM) of the warpage adjusting layer, at temperatures under 25° C.

4. The optical information recording medium according to claim 1, including at least a second temperature region in which the modulus in tension (CM) of the light transmitting layer$\leq 1000$ MPa, at temperatures under 25° C.

5. The optical information recording medium according to claim 1, satisfying the relationship that the glass transition temperature (CT) of the light transmitting layer<the glass transition temperature (ST) of the warpage adjusting layer.

6. The optical information recording medium according to claim 1, satisfying the relationship that the thickness (CTh) of the light transmitting layer>the thickness (STh) of the warpage adjusting layer.

7. The optical information recording medium according to claim 1, wherein the thickness (STh) of the warpage adjusting layer≦50 μm.

8. The optical information recording medium according to claim 1, wherein the warpage adjusting layer is made from a radiation curable resin that includes a urethane acrylate oligomer as a monomer component.

9. The optical information recording medium according to claim 1, wherein an inorganic film for adjusting warpage caused by humidity is further disposed between the substrate and the warpage adjusting layer.

10. The optical information recording medium according to claim 1, wherein the warpage adjusting layer is composed of a different material from that of the light transmitting layer.

11. An optical information recording medium, comprising:
- a substrate having a first side with an information recording layer formed thereon and a second side opposite the first side;
- a light transmitting layer covering the information recording layer and being composed of a radiation curable resin;
- a warpage adjusting layer for adjusting warpage of the light transmitting layer caused by temperature changes, the warpage adjusting layer being on the second side of the substrate; and
- an inorganic film for adjusting warpage caused by humidity, the inorganic film being disposed between the substrate and the warpage adjusting layer,
- wherein said optical information recording medium includes at least a first temperature region that satisfies the relationship that the modulus in tension (CM) of the light transmitting layer<the modulus in tension (SM) of the warpage adjusting layer, at temperatures under 25° C.

12. The optical information recording medium according to claim 11, including at least a second temperature region in which the modulus in tension (CM) of the light transmitting layer≦1000 MPa, at temperatures under 25° C.

13. The optical information recording medium according to claim 11, satisfying the relationship that the glass transition temperature (CT) of the light transmitting layer<the glass transition temperature (ST) of the warpage adjusting layer.

14. The optical information recording medium according to claim 11, satisfying the relationship that the thickness (CTh) of the light transmitting layer>the thickness (STh) of the warpage adjusting layer.

15. The optical information recording medium according to claim 11, wherein the thickness (STh) of the warpage adjusting layer≦50 μm.

16. The optical information recording medium according to claim 11, wherein the warpage adjusting layer is made from a radiation curable resin that includes a urethane acrylate oligomer as a monomer component.

17. The optical information recording medium according to claim 11, wherein an inorganic film for adjusting warpage caused by humidity is further disposed between the substrate and the warpage adjusting layer.

18. The optical information recording medium according to claim 11, wherein the warpage adjusting layer is composed of a different material from that of the light transmitting layer.

19. A method for manufacturing an optical information recording medium used for recording and reproduction and for reproducing recorded information, comprising:
- a substrate having a first side with an information recording layer formed therein and a second side opposite the first side;
- a light transmitting layer covering the information recording layer and being composed of a radiation curable resin; and
- an inorganic film for adjusting warpage caused by humidity, the inorganic film being disposed between the substrate and the warpage adjusting layer,
- said method including forming a warpage adjusting layer for adjusting warpage of the light transmitting layer caused by temperature changes, by a printing method on the second side of the substrate, and a relationship that the coefficient of linear expansion (CL) of the light transmitting layer<the coefficient of linear expansion (SL) of the warpage adjusting layer in at least a temperature region under 25° C. is satisfied.

20. The manufacturing method according to claim 19, wherein the printing method is screen printing.

21. The manufacturing method according to claim 19, wherein a pigment is added to the warpage adjusting layer.

* * * * *

UNITED STATES PATENT AND TRADEMARK OFFICE
CERTIFICATE OF CORRECTION

| | |
|---|---|
| PATENT NO. | : 7,782,746 B2 |
| APPLICATION NO. | : 11/956127 |
| DATED | : August 24, 2010 |
| INVENTOR(S) | : Keiji Nishikiori et al. |

Page 1 of 1

It is certified that error appears in the above-identified patent and that said Letters Patent is hereby corrected as shown below:

In column 16, in claim 2, line 49, "$\geq 1 \times 10^{-5}/°C.,$" should read -- $\geq 1 \times 10^{-5}/°C$, --.

In column 18, in claim 19, line 38, "under 25° C." should read -- under 25° C --.

Signed and Sealed this
Fourth Day of January, 2011

David J. Kappos
*Director of the United States Patent and Trademark Office*